United States Patent [19]

Roehrick

[11] Patent Number: 5,469,653
[45] Date of Patent: Nov. 28, 1995

[54] APPARATUS AND METHOD FOR PEST CONTROL

[76] Inventor: Harry V. Roehrick, One Plaza Loma, Novato, Calif. 94947

[21] Appl. No.: 234,238

[22] Filed: Apr. 28, 1994

[51] Int. Cl.⁶ .................................................. A01G 13/00
[52] U.S. Cl. ............................... 47/1.7; 43/132.1; 239/77
[58] Field of Search ............................ 47/1.7; 43/132.1, 43/138, 142, 141, 140; 239/77

[56] References Cited

U.S. PATENT DOCUMENTS

| | | | |
|---|---|---|---|
| 2,201,463 | 5/1940 | Williams | 43/140 |
| 2,977,715 | 4/1961 | Lindsay | 47/1.7 |
| 4,274,589 | 6/1981 | Jones | 47/1.7 |
| 4,825,582 | 5/1989 | Szynal . | |
| 4,893,755 | 1/1990 | Keathley . | |
| 5,002,227 | 3/1991 | Ehrenberg | 47/1.7 |
| 5,028,002 | 7/1991 | Whitford | 47/1.7 |
| 5,040,329 | 8/1991 | Michaloski | 47/1.7 |

OTHER PUBLICATIONS

Leaf Lifter Sprayer, Advertising Brochure Alloway Rau.
Conestoga Microspace Sprayer; Conestoga Equipment Co., Feb. 19, 1920; pp. 1–3; Factors That Produce Efficient Spray Droplets, J. Phillip Keathley, Ph.D.; pp. 1–4. Keathley, J. Phillip Inc.; Agricultural Services Division; The Conestoga Equipment Company Flip Chart; Feb. 14, 1990; pp. 1–5.
The Melrose Spra-Coupe 3000 Series; The 3430 Model, Advertising Brochure.
AG-VAC, Mechanical Insect Control; Advertising Brochure.
Gearmore Wrap-A-Round Room; Gerrmore Inc.; Advertising Brochure.
Gearmore Low Volume Air Boom Sprayers; Gerrmore Inc.; Advertising Brochure.
Spray-Air; Spray-Air Canada Lt. and Spray-Air USA Inc., Advertising Brochure.
Air-Assisted Electrostatic Spraying; Electrostatic Spraying Systems, Inc.; Advertising Brochure; pp. 1–14.
Electrostatic Sprayers for Field Applications, Electrostatic Spraying Systems, Inc., Advertising Brochure.
Air-Assisted Electrostatic Vineyard Sprayers; Electrostatic Spraying Systems, Inc.; Advertising Brochure.
New Air-Assisted Electrostatic Sprayers for Field Crops; 66-A Series; Electrostatic Spraying Systems, Inc.; Advertising Brochure.
John Deere Sprayers; Advertising Brocbure; John Deere, pp. 1–20.
Defoliating Boom; HCL Machine Works, Inc.; Advertising Brochure.
Gearmore Venturi Air Sprayers 3-Point Hitch Models, Gerrmore Inc., Advertising Brochure.

*Primary Examiner*—Henry E. Raduazo
*Attorney, Agent, or Firm*—Flehr, Hohbach, Test, Albritton & Herbert; Edward N. Bachand

[57] ABSTRACT

An apparatus for the application of a liquid chemical treatment to plants in a field. The apparatus includes a movable framework and first and second spaced-apart depending portions, mounted upon the framework for providing a space extending longitudinally of the framework. First and second air displacers are carried by the first and second depending portions for creating first and second opposed streams of air in directions at an angle to the longitudinal axis. The air displacers are positioned on the depending portions so that the first and second opposed streams of air are longitudinally offset from each other. Nozzles are carried by the framework for introducing the liquid chemical treatment into the streams of air produced by the air displacers. The streams of air cause the plants to bend to and fro as the plant passes through the space so as to permit the chemical treatment to reach the underside of the plants. A method for using the apparatus is provided.

24 Claims, 5 Drawing Sheets

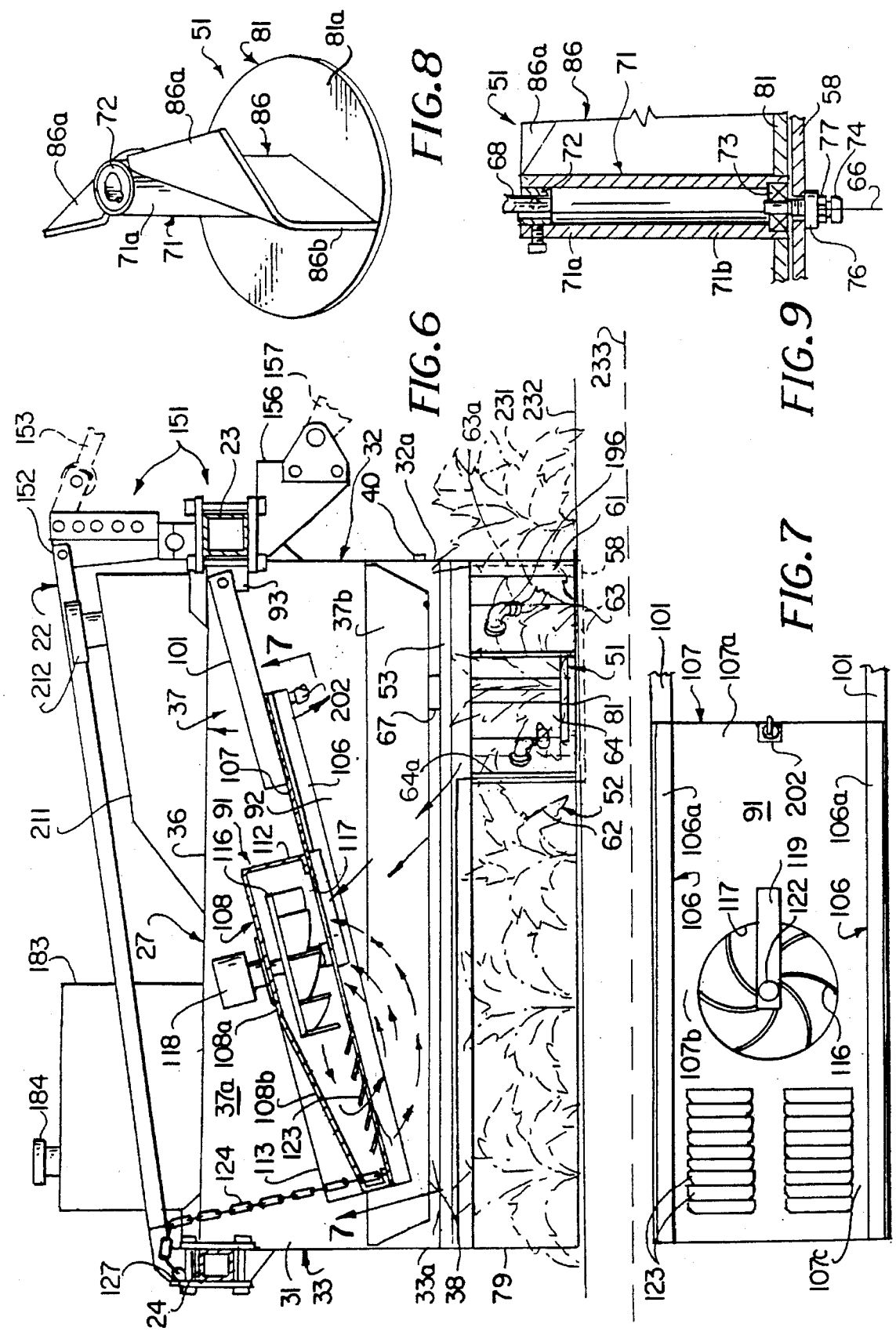

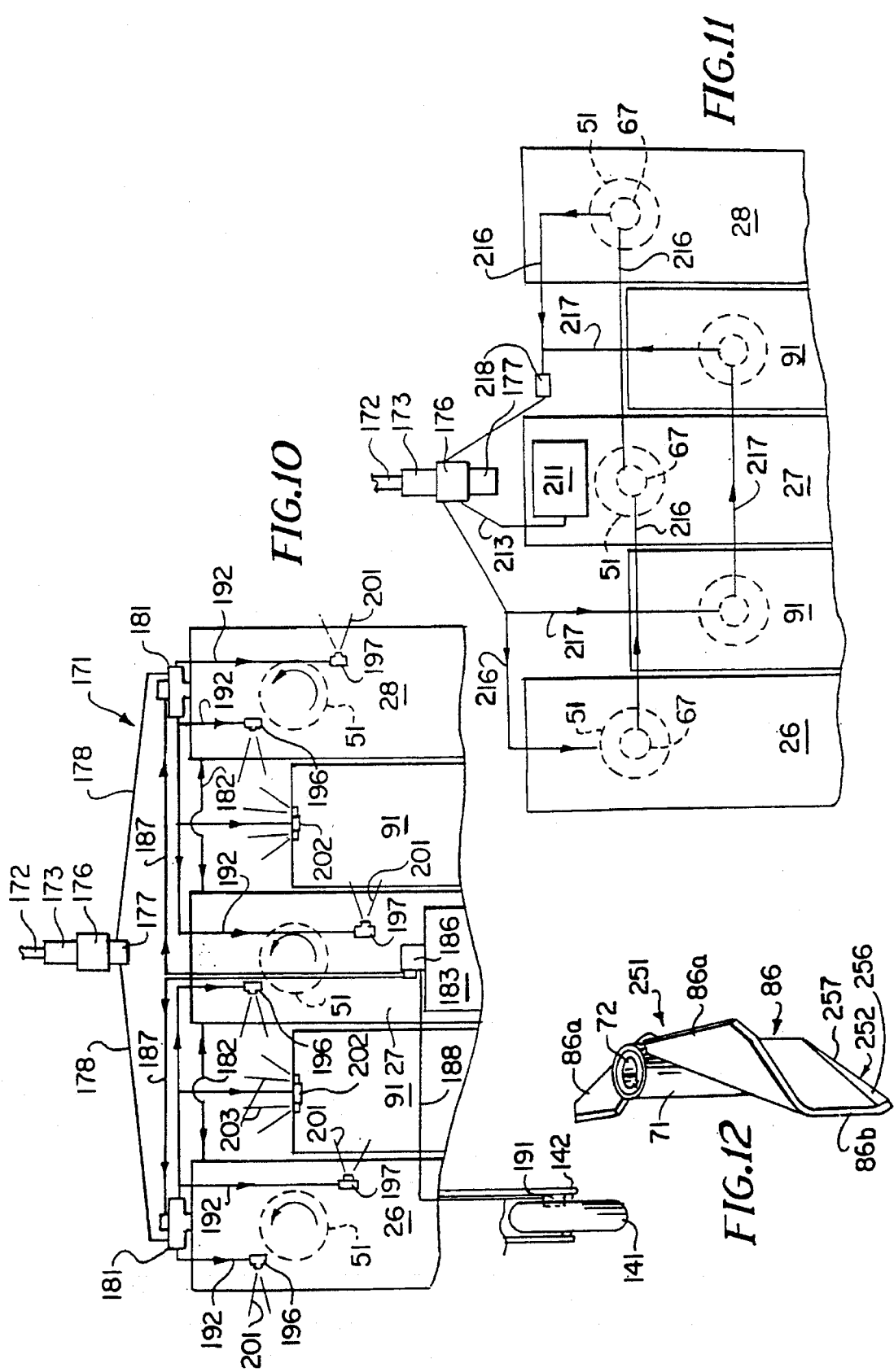

APPARATUS AND METHOD FOR PEST CONTROL

This invention pertains generally to apparatus and methods for controlling pests on vegetation and, more particularly, to apparatus and methods for spraying pesticides on row crops.

Spray apparatus, some of which are air assisted, have been heretofore provided for controlling pests on plants in a field. These sprayers are typically for use with tractors and deliver a pesticide or other chemical treatment toward the top and/or sides of the plants. Some sprayers dispense electrostatically charged droplets which are attracted to plant surfaces. However, the charged droplets are also attracted to the operator. Other sprayers dispense the pesticide in a generally enclosed space for controlling spray drift. The aforementioned sprayers have limited effectiveness in controlling insects which reside under the leaves of plants. In addition, the most efficient of these sprayers claim to deliver only 60% of the pesticide to the plants. As a result, there is a need for a new and improved spray apparatus.

In general, it is an object of the present invention to provide an apparatus and method for delivering a chemical treatment to plants and/or for destroying insects crawling on and flying about the plants.

Another object of the invention is to provide an apparatus and method of the above character which delivers relatively complete plant coverage of a chemical treatment.

Another object of the invention is to provide an apparatus and method of the above character in which chemical treatment reaches the underside of the leaves and stems of the plant.

Another object of the invention is to provide an apparatus and method of the above character in which chemical treatment is delivered to the plant in two longitudinally offset streams of air.

Another object of the invention is to provide an apparatus and method of the above character in which the two streams of air are urged upwardly about the plant.

Another object of the invention is to provide an apparatus and method of the above character in which the chemical treatment is delivered in a controlled environment.

Another object of the invention is to provide an apparatus and method of the above character which controls and maintains a saturated atmosphere surrounding the plant canopy while in travel.

Another object of the invention is to provide an apparatus and method of the above character in which chemical treatment not deposited on a plant is recirculated to minimize undesirable drift.

Another object of the invention is to provide an apparatus and method of the above character in which insects flying about and crawling on the plant are destroyed.

Additional objects and features of the invention will appear from the following description from which the preferred embodiments are set forth in detail in conjunction with the accompanying drawings.

FIG. 3 is a rear elevational view of the pest control apparatus of FIG. 1 taken along the line 3—3 of FIG. 1.

FIG. 6 is a cross-sectional view of the pest control apparatus of FIG. I taken along the line 6—6 of FIG. 2.

FIG. 7 is a bottom plan view of a portion of the pest control apparatus of FIG. 1 taken along the line 7—7 of FIG. 6.

FIG. 8 is an isometric view of a portion of the pest control apparatus of FIG. 1.

FIG. 9 is a cross-sectional view of the pest control apparatus of FIG. 1 taken along the line 9—9 of FIG. 2.

FIG. 10 is a spray solution flow diagram of the pest control apparatus of FIG. 1.

FIG. 11 is a drive fluid flow diagram of the pest control apparatus of FIG. 1.

FIG. 12 is an isometric view similar to FIG. 8 of another embodiment of a portion of the pest control apparatus of FIG. 1.

In general, the apparatus of the present invention is for the application of a liquid chemical treatment to plants in a field. The apparatus includes a movable framework and first and second spaced-apart depending portions mounted upon the framework for providing a space extending longitudinally of the framework. First and second air displacement means are carried by the first and second depending portions for creating first and second opposed streams of air in directions at an angle to the longitudinal axis. The air displacement means are positioned on the depending portions so that the first and second opposed streams of air are longitudinally offset from each other. Nozzles are carried by the framework for introducing the liquid chemical treatment into the streams of air produced by the air displacement means. The streams of air cause the plants to bend to and fro as the plant passes through the space so as to permit the chemical treatment to reach the underside of the plants. A method for using the apparatus is provided.

Figure 1:
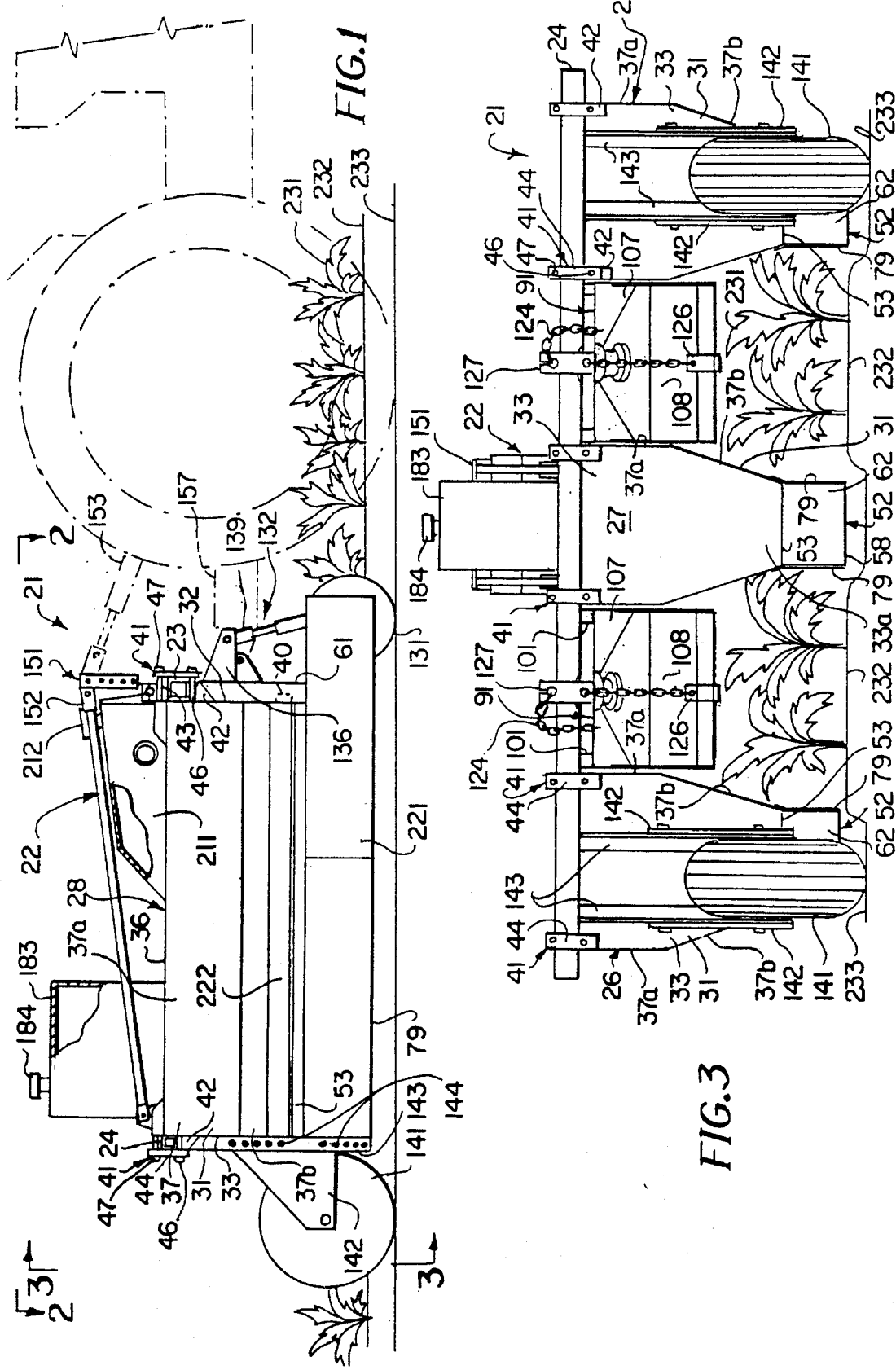
FIG. 1 is a side elevational view, partially cut away, of the pest control apparatus incorporating the present invention in operation with a conventional farming tractor.
Figure 2:
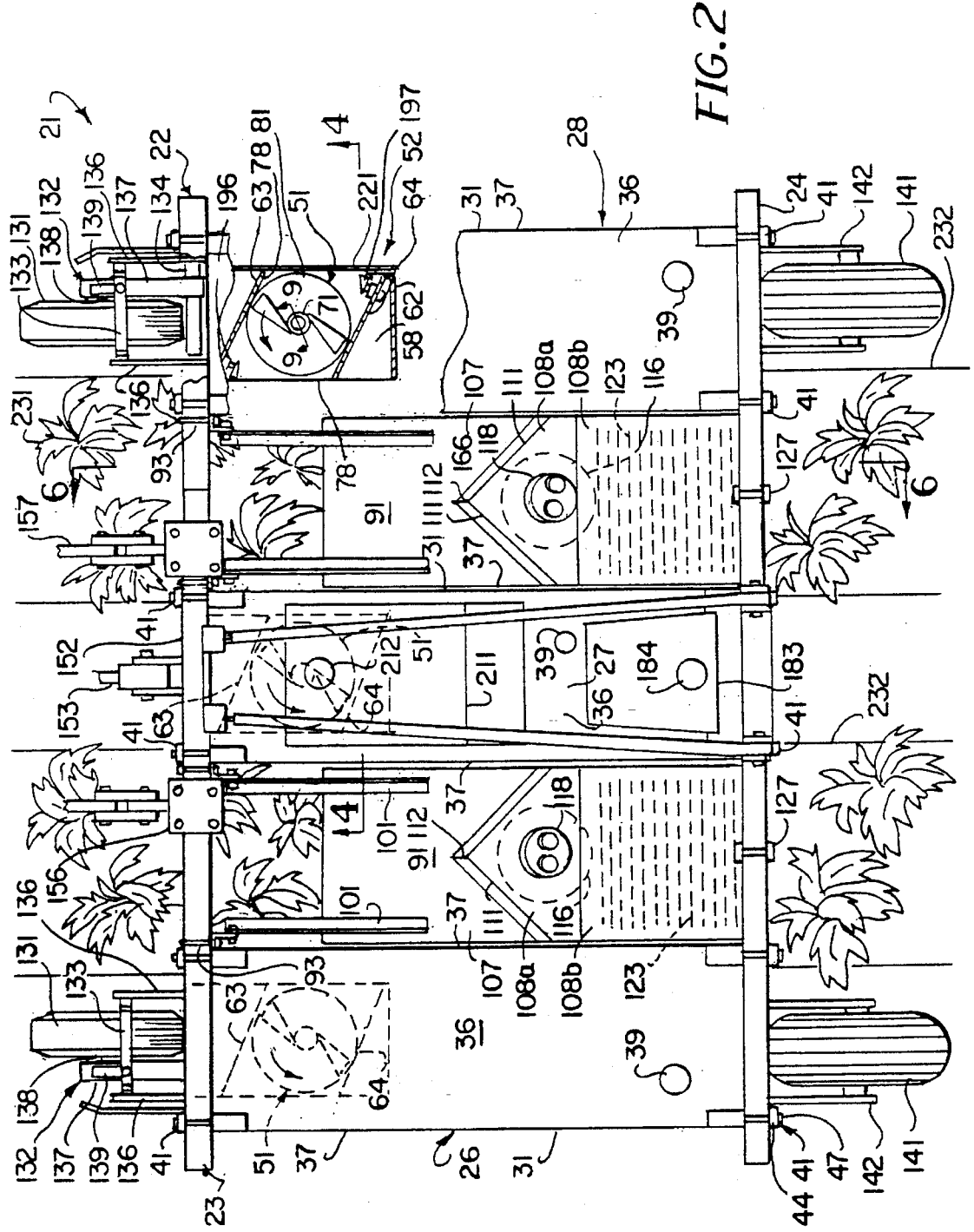
FIG. 2 is a top plan view, partially cut away, of the pest control apparatus of FIG. 1 taken along the line 2—2 of FIG. 1.

More in particular, the air-assisted spraying apparatus or sprayer 21 of the present invention is for applying a liquid chemical treatment such as a pesticide to control insect infestation of row crops (see FIGS. 1 through 3). Sprayer 21 has a framework 22 which includes first or front and second or rear parallel spaced-apart hollow mounting bars 23 and 24 which extend in a generally horizontal direction. Mounting bars 23 and 24 are made from any suitable material such as steel and have a length ranging from approximately 40 to 200 inches. The mounting bars are generally square in cross section and have a transverse dimension or width of approximately three inches.

Sprayer 21 is provided with at least two spaced-apart parallel depending wall portions and is shown in the drawings with a first or left module 26, a second or middle module 27 and a third or right module 28 extending longitudinally of bars 23 and 24. Each of the modules is formed with a 75 gallon tank made from aluminum or any other suitable material and having a length of approximately 60 inches and a height of approximately 20 inches. Tanks 31 are formed from a plurality of planar wall portions in the form of front and rear walls 32 and 33, top wall portion or ceiling 36, spaced-apart generally parallel side walls 37 and bottom wall portion or floor 38. Side walls 37 include generally parallel planar top portions 37a which are spaced-apart a distance of approximately 12 inches and extend downwardly from ceiling 36 and planar bottom portions 37b which extend inwardly toward each other to join floor 38 disposed generally parallel to ceiling 36. Inlet fittings 39 are provided on ceiling 36 and outlet fittings 40 are provided near the bottom of front walls 32 for each tank 31.

Adjacent modules 26, 27 and 28 are mounted upon front and rear mounting bars 23 and 24 and can be centered relative to each other a distance ranging from 30 to 60 inches. Each of the four top corners of each module is mounted to the respective mounting bar 23 or 24 by means of a mounting assembly 41 which includes a lower bracket 42 extending longitudinally from the module and a threaded stud 43 extending longitudinally from the module and vertically spaced above bracket 42 a distance sufficient to permit the disposition of the mounting bar between bracket 42 and threaded stud 43. A clamping plate 44 is included within each mounting assembly 41 and is mounted at one end to bracket 42 by bolt 46 and provided with a bore (not shown) at the other end for receiving a threaded stud 43. Nuts 47 thread to the ends of studs 43 and when tightened serve to clamp plates 44 against the mounting bars and thus secure the module to framework 22.

Each module 26, 27 and 28 has an air-displacement means in the form of an impeller 51 mounted below the front of tank 31 thereof (see FIG. 6). Front and rear walls 32 and 33 of each module include depending or lower portions 32a and 33a, respectively, which extend below floor 38 of the tank a generally equal distance to support an integrated housing or shroud 52 for generally surrounding the impeller. Shroud 52 includes a top wall portion or ceiling in the form of a scupper plate 53 made from any suitable material such as aluminum and secured at its ends to depending portions 32a and 33a so as to extend generally parallel to floor 38 of tank 31 a distance of approximately four inches therebelow. Scupper plate 53 is formed with a planar central portion 53a and opposite side portions extending along the length thereof in the form of a first side wall portion 53b extending upwardly and outwardly from central portion 53a and a second side wall portion 53c extending inwardly from first sidewall portion 53b at a generally right angle. The opening so formed along the side of the module between tank 31 and scupper plate 53 forms a return channel or scupper 57.

Shroud 52 further includes a planar rectangular metal floor plate 58 supported below scupper plate 53 at its front by first and second vertically-disposed flanged braces 61 welded in spaced-apart position to front wall 32 and at its rear by a planar metal plate 62 joined to the bottom of scupper plate 53 and extending vertically downward therefrom in general parallel alignment with braces 61. Floor plate 58 is spaced below scupper plate 53 a distance of approximately 8 inches and has a width of approximately 12 inches. Spaced-apart parallel first or front and second or rear metal baffles 63 and 64 are fixedly secured to scupper plate 53 and floor 58 so as to extend vertically therebetween. Front baffle 63 has a forward extremity 63a and rear baffle 64 has a rearward extremity 64a and the baffles extend across floor plate 58 at an oblique angle of approximately 20° relative to the longitudinal axis of the module.

Impeller 51 is made from any suitable material such as aluminum and is mounted to the bottom of tank 31 for rotation about generally vertical axis 66 by means of a hydraulic motor 67 secured to floor 38 (see FIG. 9). Motor 67 has a keyed output or stub shaft 68 extending vertically downward through an inlet opening 69 in central portion 53a of scupper plate 53. Opening 69 is circular and has a diameter of approximately 10 inches. Impeller 51 includes a cylindrical central hub 71 which is centered on axis of rotation 66 and has upper and lower extremities 71a and 71b. Hub 71 has a height of approximately seven and one-half inches and a diameter of approximately two inches. A keyed coupling insert 72 is press fit into the upper end of hub 71 and is adapted to nonrotatably receive stub shaft 68.

A bearing 73 is press fit into the lower end of hub 71. The impeller is rotatable mounted to floor plate 58 by means of a set screw 74 extending vertically upward through the floor plate and into bearing 73. The set screw is threaded through a boss 76 provided on the bottom of the floor plate and, once the impeller has been adjusted by the set screw to the proper height above the floor plate, is locked in position by jam nut 77.

Shroud 52 is provided with an equally sized exit opening or port 78 on each side of the module. Ports 78 are rectangular in shape and defined on the sides by front and rear baffles 63 and 64 and on the top and bottom by scupper plate 53 and floor plate 58, respectively. A generally rectangular skirt 79 made from any suitable material such as plastic extends rearwardly from rear plate 62 along each side of the bottom of the module. Skirt 79 is mounted to first side wall portion 53b and extends below scupper plate 53 a distance approximately equal to the distance which floor plate 58 extends below the bottom of the scupper plate.

Figure 5:
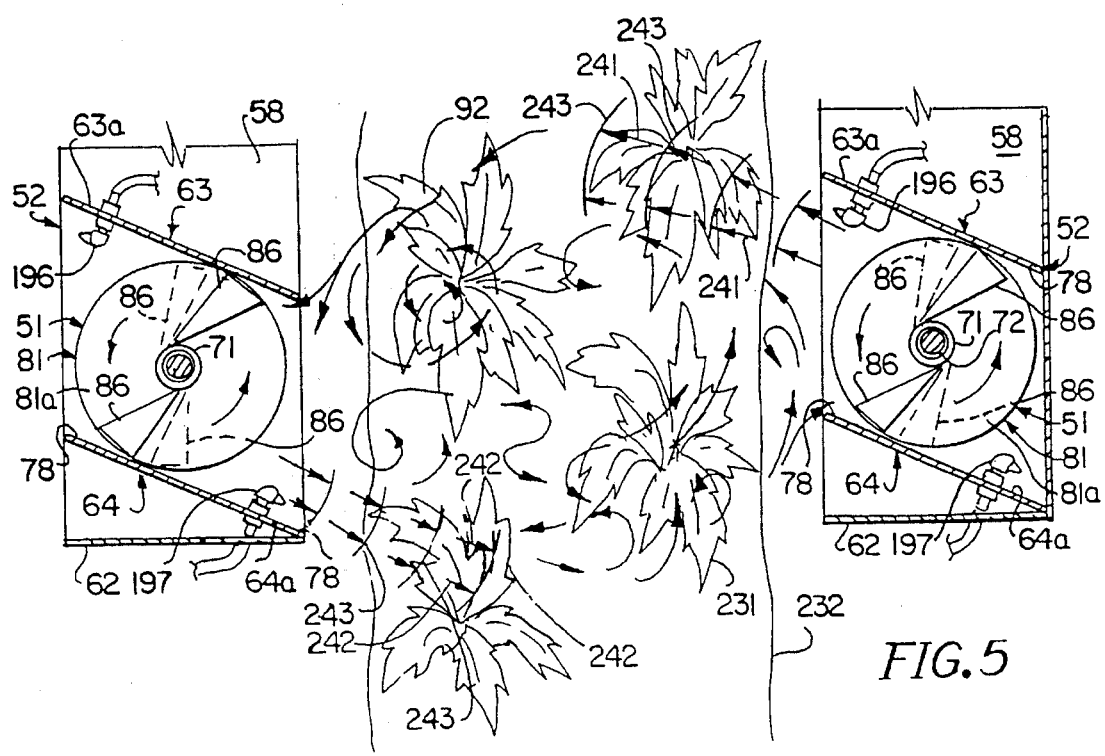
FIG. 5 is a cross-sectional view of the pest control apparatus of FIG. 1 taken along the line 5—5 of FIG. 4.

Each of the impellers 51 has a configuration for producing streams of air pulsations through ports 78 as it rotates in a shroud 52 (see FIGS. 5 and 8). The impellers include a disk-like plate or containment shield 81 welded or otherwise suitably joined about the lower end of hub 71 and having a generally circular outer circumference or periphery 82 so as to be generally circular when viewed in plan. Containment shield 81 has a diameter of approximately 11 inches and overlies and is generally parallel with floor plate 58 of the shroud.

Impeller 51 is generally rectangular in shape when viewed in elevational profile and, in this regard, is provided with first and second generally rectangular-shaped blades 86 having upper and lower portions 86a and 86b. The blades have inner edges welded or otherwise suitably joined to diametrically-opposed sides of hub 71 so as to be generally offset with respect to the hub. Planar blade lower portions 86b are welded or otherwise suitably Joined to containment shield 81 and extend from hub 71 in generally opposite parallel directions to outer periphery 82 so that the outer edges of the blades are radially aligned with the outer edge of the containment shield. Blades 86 are aligned relative to hub 71 so as to extend backwards relative to the direction of travel from a radius of containment shield 81.

Impellers 51 are configured to compress air prior to the pulsed expulsion of the air from port 78. In this regard, blade upper portion or compressor shield 86a of each blade is inclined relative to blade lower portion 86b, along an imaginary line extending generally diagonally across the blade from the top of hub 71 to the top of the outer edge of blade lower portion 86b, at an angle of approximately 12° toward the direction of travel. The upper edge of compressor shield 86a is generally parallel to containment shield 81.

Sprayer 21 has an adjustable sealing duct or cover 91 extending between the top of adjacent modules 26 and 27 and modules 27 and 28 which, together with the adjacent modules forms a space or air plenum 92 extending longitudinally of mounting bars 23 and 24 (see FIGS. 2, 6 and 7). Each canopy or cover 91 is pivotally mounted to front mounting bar 23 by means of a bracket assembly 93 secured to the mounting bar and includes spaced-apart parallel first and second arms 101 pivotally secured at one end to bracket assembly 93. Arms 101 are mounted at their other ends along opposite sides of the top of cover 91 over a portion of the length of the cover. Cover 91 is generally rectangular when viewed in plan and is formed from parallel spaced-apart first and second braces 106 extending along opposite sides of the underside of the cover and having front end portions 106a secured to the rear of respective arms 101. Arms and braces 106 are made from steel or any other suitable material. A rectangular sheet 107 having a front portion 107a, a center portion 107b and a rear portion 107c extends between braces 106 and is made from any suitable material such as aluminum.

A shroud 108 made from any suitable material such as aluminum is mounted atop sheet 107 and has a fan housing portion 108a overlying center portion 107b and a forced air portion in the form of high pressure ceiling duct 108b overlying rear portion 107c of sheet 107. Fan housing portion 108a extends above sheet 107 a distance of approximately five inches and is formed in part by first and second front wall portions 111 joined at a right angle at the center of sheet center portion 107b at 112 extending rearward toward opposite sides of the sheet. Ceiling duct 108b tapers downwardly from fan housing portion 108a toward sheet 107 to a distance of approximately three inches above the sheet at the rear end of cover 91. Vertical metal fins 113 extend rearwardly from fan housing portion 108a along the length of ceiling duct 108b at a height approximating that of the fan housing portion.

A conventional impeller or blower 116, such as made by WinSmith located in Warren, Ohio, is rotatably mounted within fan housing portion 108a over a circular inlet opening 117 provided in sheet center portion 107b (see FIGS. 2, 6 and 7). Blower 116 has a diameter of approximately 12 inches and inlet opening 117 has a diameter of approximately 10 inches. The blower is driven by a hydraulic motor 118 which is mounted on the top of fan housing portion 108a and has a keyed stub shaft (not shown) substantially similar to stub shaft 68 of motor 67. The stub shaft of motor 118 extends through sheet 107 to a keyed coupling insert (not shown) which is substantially similar to coupling insert 72 and is press fit into the upper end of hub 119 of blower 116. An arm 121 is mounted to sheet front portion 107a and extends rearwardly to the center of inlet opening 117 to carry a set screw assembly 122 which is substantially similar to set screw 74, boss 76 and jam nut 77. The set screw of assembly 122 is mounted to the free end of arm 121 and extends along the rotation axis of blower 116 into a bearing (not shown) press fit into the lower end of hub 119. Blower 116 turns at a speed ranging from 2,000 to 3,000 rpm and preferably approximately 3000 rpm.

Rear portion 107c of sheet 107 is provided with a plurality of exit louvers 123 mounted in rows which extend between braces 106. Louvers are configured so as to direct the air forced therethrough by blower 116 in a downward and forward direction within air plenum 92.

Means is carried by rear mounting bar 24 for securing cover 91 in a desired position when pivoted thereto about front mounting bar 23. An adjustment chain 124 is fixed at one end to a bracket 126 mounted to the rear of cover 91. A securing bracket 127 is mounted to rear mounting bar 24 between the adjacent modules and is configured to permit a link of adjustment chain 124 to lock thereon so that the adjustment chain supports cover 91 above the air plenum in the desired elevational position.

Sprayer 21 includes front and rear wheels carried by framework 22 for permitting the sprayer to travel down a row of plants. More specifically, a front wheel 131 is mounted by a front bracket assembly 132 to front wall 32 of each of left and right modules 26 and 28. Front bracket assemblies 132 permit wheels 131 to be elevationally adjusted and can be of a conventional design including parallel spaced-apart upper and lower cross bars 133 and 134. Upper cross bar 133 is pivotably mounted to a pair of spaced-apart brackets 136 secured to braces 61 and lower cross bar 134 is pivotally mounted to the braces below the upper cross bar. A stabilizer arm 137 is perpendicularly secured at one end of the lower cross bar and has a spindle 138 secured to its free end and extending along an axis parallel to the cross bars. A front wheel 131 is rotatably mounted to spindle 138 and the spindle is pivotally adjusted about lower cross bar 134 by means of an acme threaded rod and sleeve assembly 139 secured at one end to upper cross bar 133 and at the other end to the free end of stabilizer arm 137. Rear wheels 141 are mounted to the rear of each of left and right modules 26 and 28 by spaced-apart brackets 142 bolted to respective first and second braces 143 vertically secured to rear wall 33. Braces 143 include a plurality of aligned holes 144 extending along the length thereof for permitting the brackets and rear wheels to be adjusted vertically of the modules. Respective front and rear wheels 131 and 141 are longitudinally aligned.

Sprayer 21 is adapted for use with a conventional farm tractor, as illustrated generally in FIG. 1, and framework 22 is provided with a mounting assembly 151 for use with a conventional three-point hookup. Mounting assembly 151 includes a central structure 152 mounted to clamping plates 44 relating to middle module 27 for attachment of the central strut 153 of the three-point hookup and first and second brackets 156 mounted to front mounting bar 24 for attachment of the first and second side struts 157 of the three-point hookup.

A pesticide dispensing means or system 171 is included within sprayer 21 for dispensing a solution containing a pest control agent within air plenums 92 (see FIG. 10). System 171 is adapted to be driven by a conventional power take-off shaft 172 having a speed increaser 173 thereon for driving a variable displacement pump 176 coupled to a fixed displacement pump 177. Pump 177 is coupled by lines 178 to a pair of auxiliary motor and pump assemblies 181 mounted to front walls 32 of left and right modules 26 and 28. Auxiliary motor and pump assemblies 181 pull water from tanks 31, which are fluid-connected by lines 182 to minimize uneven weight distributions across the sprayer, for mixture with a pest controlling agent or pesticide stored within a tank 183 mounted atop the rear of middle module 27. Agent tank 183 includes an inlet fitting 184 for filling the tank with the pest control agent and a conventional agent injector 186 is fluid-coupled to the agent tank for dispensing the pest control agent through lines 187 to each of the auxiliary motor and pump assemblies. Injector 186 is electrically coupled by wire 188 to a conventional sensor mechanism 191 carried by one of rear wheels 141 and the related rear bracket assembly 142 and the injector is calibrated to dispense pest control agent from tank 183 at a rate dependent upon the speed of travel of sprayer 21.

The agent and water solution from auxiliary motor and pump assemblies 181 is pumped through fluid lines 192 to a plurality of front and rear nozzles 196 and 197 mounted to forward and rearward extremities 63a and 64a of front and rear shroud baffles 63 and 64. Nozzles 196 are directed to dispense a spray 201 in a forwardly direction through port 78 on the left side of the module into air plenum 92 and nozzles 197 are directed to dispense a spray 201 in a rearwardly direction through port 78 on the right side of the module into the adjacent air plenum. Solution from auxiliary motor and pump assemblies 181 is also pumped to overhead nozzles 202 mounted to the underside of front portion 107a of each of covers 91. Nozzles 202 dispense first and second sprays 203 downward into the air plenum in a forward direction to a region generally forward of the region covered by the spray of nozzles 196 and 197.

Variable displacement pump 176 further serves to power motors 67 and 118 (see FIG. 11). In this regard, a suitable incompressible drive fluid such as oil is stored in a tank 211 atop the forward portion of middle module 27. Tank 211 is provided with an inlet fitting 212 for filling it with the drive oil. Pump 176 pulls oil from tank 211 through inlet line 213 and forces the oil through drive line 216 to power impeller motors 67 in series. Oil is pumped through drive lines 217 for powering blower motors 118 in series. A filter 218 is coupled to lines 216 and 217 for removing debris from the oil of the drive system.

In the configuration of sprayer 21 illustrated in the drawings, the outer sides of left and right modules 26 and 28 are closed off so as to be non-operative. Outer ports 78 of modules 26 and 28 are closed off by guards or shields 221 and outer scuppers 57 are closed off by covers 222 respectively secured to the modules.

In operation, sprayer 21 is for use in applying a liquid pesticide to plants 231 aligned in rows on earthen mounds 232 extending between adjacent irrigation troughs or channels 233. In certain crops such as broccoli and strawberries, two rows of plants 231 are provided on each earthen mound 232 and separated approximately 11 to 13 inches apart. The plants of these adjacent rows are generally offset from each other and are preferably diagonal to each other.

Horizontally adjustable modules 26, 27 and 28 of sprayer 21 can be moved relative to front and rear mounting bars 23 and 24 so as to accommodate fields having differing spaced channels 233 and size containment air plenums 92 to the width of the rows in a field. Longitudinally aligned front and rear wheel sets 131 and 141 ride within two parallel channels 233 in alignment with the wheels of the tractor. Middle module 27 is suspended by mounting bars 23 and 24 over a third channel 233 disposed between the two outer channels 233. Shrouds 52 of the modules are transversely sized so as to be smaller in width than irrigation channels 233 and shrouds 52 and flexible skirts 79 are vertically sized so as to be disposed alongside earthen mounds 232 and to extend partially down into the irrigation channels. Front and rear wheels 131 and 132 are sized and elevationally adjusted relative to the modules and impellers 51 so that the base of the impellers are in general vertical alignment with the top of earthen mounds 232.

After tanks 31 have been filled with water, tank 183 has been filled with the pest control agent and tank 211 has been filled with the drive oil, covers 91 are elevationally adjusted so that rear portion 107*c* thereof extends downwardly close to the top of the plant canopy of the crops being sprayed. Covers 91 are locked in this position by the securement of adjustment chains 124 to respective brackets 127. The sides of the covers approach the adjacent modules to maintain the controlled environment within air plenums 92, and fins 113 are juxtaposed with or in close vicinity to vertically disposed top portions 37*a* of tanks 31 to further facilitate the general sealing engagement of the covers and adjacent modules.

Front and rear wheels 131 and 141 are elevationally-positioned so that sprayer 21 has a slight forward inclination (see FIG. 1). The forward tilt of tanks 31 causes the water therein to accumulate toward the front of the tanks to enhance the gravity flow of the water through outlet fittings 40 provided on front walls 32 of the tanks. The forward accumulation of the water also moves the center of gravity of sprayer 21 closer to the tractor to facilitate raising and lowering of the sprayer by the three-point hookup or hitch of the tractor.

Once sprayer 21 has been properly aligned relative to two rows of plants 231, motors 67 and 118 are activated to commence rotation of impeller 51 and blowers 116 and the sprayer is pulled across the field by the tractor. Blades 86 of impellers 51 are similarly aligned and the impellers are driven in the same angular direction at the same speed so as to by synchronized. Plants 231 passing beneath the sprayer are initially sprayed from the top by overhead nozzles 202. The direction and angle of overhead spray 203 can be adjusted to best suit the relative alignment and size of the plants being treated.

The counterclockwise rotation of lower impellers 51 creates first and second opposed streams of air 241 and 242 within an air plenum 92 which are transverse to the direction of travel of sprayer 21. Air streams 241 and 242 travel from the depending modules in directions at an angle to the longitudinal axis of the sprayer to assist in the dispersal of atomized spray 201 from nozzles 196 and 197. The relative longitudinal alignment of impellers 51 causes the first and second streams of air to be generally offset from each other. As more specifically illustrated in FIGS. 4 and 5 with respect to middle and right modules 27 and 28, the first stream of air 241 of the right module is created by blades 86 of impeller 51 of the right module passing front baffle 63 so as to force air outwardly from the front portion of port 78 in a forward direction at an oblique angle to the longitudinal axis of the sprayer. In a similar manner, second stream of air 242 of the middle module is produced by the blades of impeller 51 of the middle module engaging rear baffle 64 so as to force air through the rear portion of port 78 facing the right module. This second stream of air is pushed by the impeller in a rearward direction at an oblique angle relative to the longitudinal axis of the sprayer. Air streams 241 and 242 exit respective ports 78 in general parallel directions. The desirable operating speed of impellers 51 ranges from approximately 1,600 to 2,000 rpm and preferably approximately 2000 rpm.

The configuration of impellers 51 causes streams of air 241 and 242 to consist of a sequence of distinct air pulsations 243. As discussed above, each impeller 51 is provided with two blades 86 which are offset from each other about impeller hub 71. In a module having two operative ports 78, such as middle module 27 in the embodiment illustrated, each revolution of the impeller causes each of blades 86 to approach and pass each of baffles 63 and 64 and thus create two air pulsations 243 extending forwardly from one port 78 of the module and two air pulsations 243 extending rearwardly from the other port 78 of the module.

The intensity of air pulsations 243 is enhanced by the relative cooperation between impeller 51 and baffles 63 and 64 and by the conformation of impellers 51. More specifically, as a blade 86 approaches a baffle 63 or 64, the rearward inclination of the blade from hub 67 to outer periphery 82 of containment shield 81 causes the air being pushed by the blade to be compressed between the blade and the baffle. The containment shield and the forward inclination of compressor shield 86*a* of the blade furthers the compression of the air as the blade approaches and passes the baffle. Once the blade has passed the baffle, the compressed air is allowed to expand and is expelled outwardly through port 78 in a pronounced pulsation 243. Although impellers 51 are shown as having two blades 86, it should be appreciated that an impeller having as few as one blade and as many as five blades would be within the scope of the present invention.

The rotation of impeller 51 thus produces a high pressure region at the outlet portion of port 78. Conversely, the continued rotation of the blade toward the other baffle draws air into the other half of port 78 to create a low pressure region at this portion of the port. The forward inclination of rear baffle 64 and its extension in front of the intake portion of impeller 51 limits the magnitude of this low pressure region so that plants 231 are not sucked within shroud 52 and destroyed by the impeller. The general diagonal disposition of these respective high and low pressure regions in air plenum 92 tends to encourage streams of air 241 and 242 to traverse the air plenum. First stream of air 241 is attracted to the low pressure region at the forward portion of port 78 on the left side of the air plenum. Similarly, second stream of air 242 is attracted to the low pressure region at the rear portion of port 78 on the right side of the air plenum. Portions of air streams 241 and 242 are recycled by the opposing impeller 51 and redirected back into the air plenum.

Front and rear nozzles 196 and 197 serve to introduce the liquid pesticide and water solution into streams of air 241 and 242 for dispersement into air plenums 92. The size of the droplets dispensed in sprays 201 can be adjusted by altering the pressure of the solution dispensed by nozzles 196 and 197. In general, as will be appreciated by those skilled in the art, the size of the droplets is inversely proportional to the pressure produced by auxiliary motor and pump assemblies 181. Some of the solution evaporates within air plenum 92 thus reducing the temperature therein. This pressure can range from 30 to 500 psi and is preferably approximately 150 psi.

The sequential introduction of opposed streams of air 241 and 242 into an air plenum 92 produces significant turbulence within the air plenum for removing pests, larvae, eggs and nymphs from plants 231 and effecting relatively complete coverage of the plants with the pesticide solution for destroying pests not removed from the plants (see FIG. 5). The turbulence causes plants 231 to bend to and fro as they pass through the air plenum. Modules 26, 27 and 28 are elevationally positioned relative to mounting bars 23 and 24 so that lower impellers 51 and shrouds 52 are relatively close to the ground. As a result, streams of air 241 and 242 and sprays 201 from nozzles 196 and 197 commence close to earthen mounds 232 and the base of plants 231. As sprayer 21 passes over a plant 231, the air blast from the first stream of air 241 causes the plant to bend in the direction of this air flow and expose the stems and the underside of the leaves of the plant to the pesticide solution carried by the stream of air. The plant is then hit by second stream of air 242 and bends in the opposite direction to expose the underside of the leaves on the other side of the plant to the pesticide solution in this stream of air. The! high frequency cyclic nature of the air streams-enhances turbulence within the air plenum and the resulting bending of plants 231 and the overturning of their leaves.

The synergistic reaction of the swirling air within air plenum 92 and the reduction in air temperature about plants 231 as they pass through sprayer 21 enhance the effectiveness of the sprayer. The whirling of the air within the air plenum produces eddies between and around plants 231 which cause the plants to gyrate and rotate thus facilitating the distribution of the pesticide under and about the plants. The wind shear caused in the air plenum by the bypassing air streams also excites a vigorous air to mass reactionary foliage vibration of the plants. This air pulse recoiling aura within the air plenum separates and dislodges insects from their underleaf habitat and entrains the insects within the recoiling air currents in the air plenum. The relatively lower air temperature of the solution saturated environment within the air plenum also urges the insects from the plants. Insects carried by an air stream into an opposing impeller 51 are destroyed.

Figure 4:
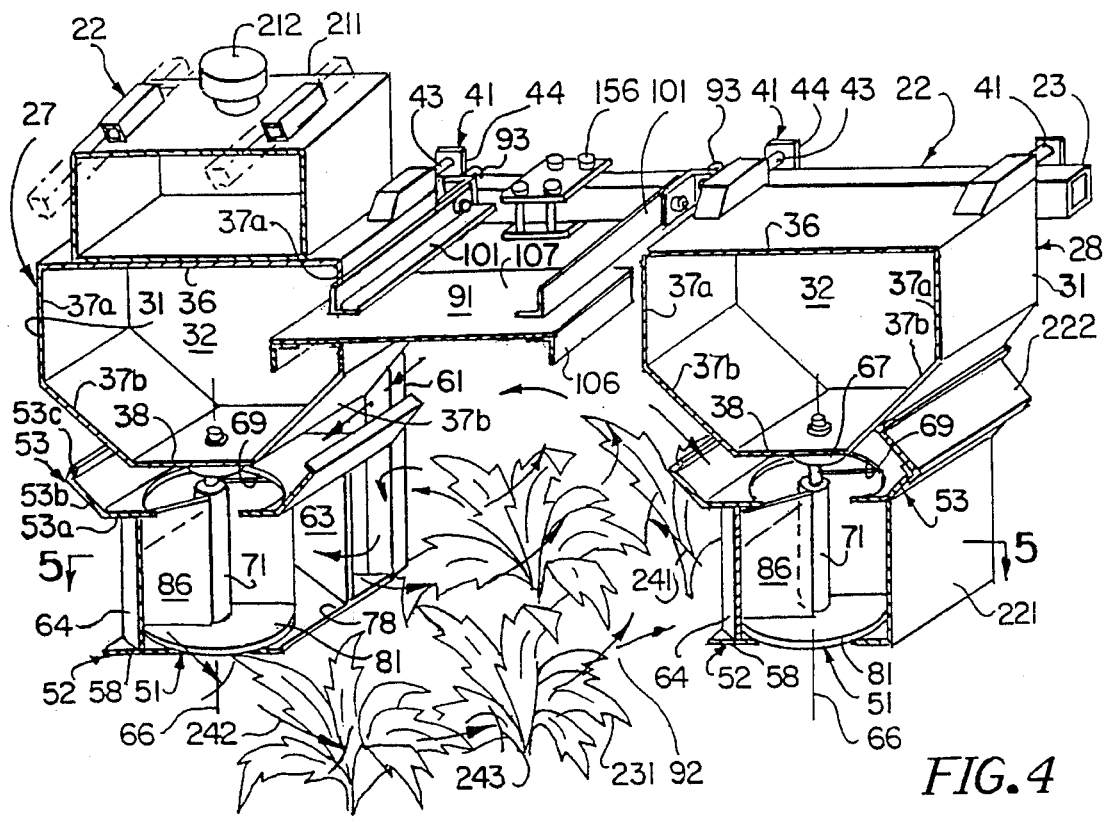
FIG. 4 is an isometric view of the pest control apparatus of FIG. 1 taken along the line 4—4 of FIG. 2.

Sprayer 21 includes means for causing first and second streams of air 241 and 242 to rise upwardly about plants 231 to create a rising spiral vortex within an air plenum 92 (see FIG. 4). In general, the air and solution within the air plenum rises because of the pressure differential between the top and bottom of the air plenum. The relative high pressure at the bottom of the air plenum is caused by impellers 51 and the relative low pressure at the top of the air plenum above the impellers is created by the vacuum generated by intake blower 116. This upward draft is facilitated by scuppers 57, which draw air and solution into the space between tank floor 38 and scupper plate 53 to feed the rotating impellers below inlet opening 69 of the scupper plate, and skirts 79, which maintain the relatively high pressure at the bottom of the air plenum. Skirts 79 are positioned relatively close to the sides of earthen mounds 232 and generally preclude the pressurized air within the air plenum from escaping beneath the modules into irrigation channels 233. Cover 91 extending over the air plenums hinder the escape of air and solution through the top of sprayer 21.

More specifically with respect to middle and right modules 27 and 28 illustrated in FIGS. 4 and 5, first stream of air 241 from the right module rises upwardly as it is directed toward the middle module and then circles back against cower 91 and down the other side of air plenum 92 against the right module. Some of this air is sucked into scupper 57 of the right module and reintroduced into the air plenum by impeller 51 of the right module. Simultaneously, second stream of air 242 from the middle module passes over earthen mound 232 before circling up against the right module, cover 91 and back down the right module. The inward inclination of side wall bottom portions 37b of tanks 31 aids the drawing of air into scuppers 57 and the forward inclination of compressor shield 86a of the impellers assist in the drawing of the air through inlet openings 69. The upward draft of air within the air plenum draws the pesticide solution carried within the air up through the underside of the plant canopy thus causing the solution to envelop the plant. Although some of the solution may impact the sides of tanks 31 and some of the evaporated solution may condense on the sides of the tanks, the inward taper of the tanks and the extension of scupper plates 53 beneath the taper of the tanks cause this solution to drain onto the scupper plates and into inlet openings 69.

Blowers 116 carried by covers 91 further serve as means for recirculating and reclaiming air and atomized solution with air plenum 92 (see FIG. 6). The conformation of blower 116 and shroud 108 of each cover force air and solution drawn into the blower through inlet opening 117 down through adjustable ceiling duct 108b of the shroud and through louvers 123. The inclination of the louvers recirculates the air and solution downwardly and forwardly into the air plenum against plants 231 therein. Some of this solution and air is recirculated through blower 116. In this manner, blowers 116 and shrouds 103 serve to continually recycle and recover unused pesticide solution through air plenum 92 and minimize the amount of atomized solution lost to drift or absorbed by the ground.

The recirculating air curtain created by covers 91 also serves to atomize and disintegrate insects airborne about plants 231. These insects, urged from the plants by the pesticide laden mist within air plenum 92, are sucked upwardly through inlet opening 117 of cover 91 and destroyed by the revolving blades of blower 116. The elevational placement of cover 91 relatively close to plants 231 facilitates the operation of blower 116.

Sprayer 21 is relatively efficient in the delivery of the atomized pesticide-laden solution to the targeted plants. As discussed above, covers 91 and skirts 79 contribute to the confinement of the pesticide solution within air plenum 92 and about plants 231. Impellers 51 and blowers 116 serve to recirculate or reclaim the pesticide solution within the air plenum. The relative upward movement of the air and solution within air plenum 92 tends to minimize the amount of solution which is undesirably absorbed by the ground. The efficiency of sprayer 21 is enhanced by the relatively small saturated air space of the air plenum. It has been found that sprayer 21 applies approximately 70% of the pesticide utilized to the targeted plants.

The relatively enclosed environment within sprayer 21 also minimizes undesirable pesticide drift and permits the sprayer to operate during heavy breezes which preclude operation of most conventional sprayers.

It should be appreciated that the features of sprayer 21 can be selectively operated when conditions necessitate and be within the scope of the present invention. For example, when treating relatively young or small plants 231, covers 91 can be lowered relatively close to the plants and 15prayer 21 operated with only overhead nozzles 202 and blowers 116. These small plants may have little foliage under which pests can reside and require only overhead spraying to treat the blossoming crowns and the remainder of the tops of the plants. Blowers 116 operate as above to recirculate the pesticide solution and atomize the insects airborne about the plants. In another example, sprayer 21 can be operated without a chemical treatment when it is desired that impellers 51 and blowers 116 serve as means for destroying insects on and/or about the plants.

It should also be appreciated that sprayer 22 can operate with only two modules or with more than three modules and be within the scope of the present invention. If only a single row of plants requires treatment, middle module 27 can be removed and left and right modules 26 and 28 moved closer together on front and rear mounting bars 23 and 24 to create a single air plenum 92 therebetween. Alternatively, mounting bars 23 and 24 having lengths greater than the mounting bars illustrated in the drawings can be used for adding other modules to treat more than two rows of crops in a single pass across the field. Additional covers 91 can be mounted to this extended front mounting bar between adjacent modules.

Furthermore, although reference has been made to the delivery of pesticides, fungicides, soaps, organic pest controls and other chemical treatments for plants can also be delivered by sprayer 21 and be within the scope of the present invention. Sprayer 21 permits various chemical treatments to be delivered individually or in a combined mixture for simultaneously delivery.

In another embodiment of an impeller for use with shroud 52, an impeller 251 is provided which is substantially similar to impeller 51. Impeller 251 is illustrated in FIG. 12 wherein like features are referenced with the corresponding numbers of impeller 51. Impeller 251 does not include a bottom plate such as containment shield 81 of impeller 51. Instead, the lower edge of blade lower portion 86b is provided with a forwardly extending tab or ridge 252 formed across the bottom of the blade lower portion. Ridge 252 extends radially outwardly from hub 71 at an angle relative to blade lower portion 86b. More specifically, the ridge commences where the blade lower portion is joined to hub 71 and extends outwardly to the outer edge of the blade lower portion. The ridge includes an upper surface 256 which extends forwardly and downwardly from the front face of lower portion 86b to an edge 257.

In operation and use, impeller 251 is elevationally adjusted in shroud 52 so that ridge 252 is relatively close to floor plate 58. Ridge 252 serves to urge any solution which has accumulated on the floor plate onto the face of blade 86 and out port 78 into air plenum 92. Ridge 252 also serves to atomize any insects which have accumulated on the upper surface of the floor plate 58.

From the foregoing, it can be seen that an apparatus and method for delivering a chemical treatment to plants and/or for destroying insects crawling on and flying about the plants has been provided. The apparatus and method effects relatively complete plant coverage of a chemical treatment and delivers chemical treatment to the underside of the leaves and stems of the plant. Chemical treatment is delivered to a plant in a controlled environment in two longitudinally offset streams of air which are urged upwardly about the plant. The apparatus and method controls and maintains a saturated atmosphere surrounding the plant canopy while in travel. Chemical treatment not deposited on a plant is recirculated to minimize undesirable drift. Insects crawling on and flying about the plant are entrained in the streams of air and destroyed. The apparatus and method minimize damage to the plantings by eliminating physical or mechanical contact between the apparatus and the plantings.

What is claimed is:

1. In an apparatus for application of a liquid chemical treatment to plants in a field, a movable framework, first and second spaced-apart depending portions mounted upon the framework for providing a space extending longitudinally of the framework, first and second air displacement means carried by the first and second depending portions for creating first and second pulsed streams of air in directions at an angle to the longitudinal axis, the air displacement means being positioned on the depending portions so that the first and second pulsed streams of air are longitudinally offset from each other, and nozzles carried by the framework for introducing the chemical treatment into the pulsed streams of air produced by the air displacement means whereby the pulsed streams of air cause the plants to bend to and fro as the plant passes through the space so as to permit the chemical treatment to reach the underside of the plants.

2. An apparatus as in claim 1 together with means for causing the first and second pulsed streams of air to rise upwardly about the plant.

3. An apparatus as in claim 1 together with a covering carried by the framework and extending between the depending portions for confining the chemical treatment about the plant.

4. An apparatus as in claim 3 together with recirculating means carried by the framework for destroying pests airborne about the plants.

5. An apparatus as in claim 1 together with wheels carried by the framework for permitting the framework to travel down a row of plants.

6. An apparatus as in claim 1 together with a third depending portion mounted to the framework alongside one of the first and second depending portions for operating with said one of the first and second depending portions on a second row of plants.

7. In an apparatus for application of a liquid chemical treatment to plants in a field, a movable framework, first and second spaced-apart depending portions mounted upon the framework for providing a space extending longitudinally of the framework, first and second impellers rotatably mounted to the depending portions for creating first and second streams of air in directions at an angle to the longitudinal axis, the impellers being positioned on the depending portions so that the first and second streams of air are longitudinally offset from each other, and nozzles carried by the framework for introducing the liquid chemical treatment into the streams of air produced by the impellers whereby the streams of air cause the plants to bend to and fro as the plant passes through the space so as to permit the chemical treatment to reach the underside of the plants.

8. An apparatus as in claim 7 wherein the impellers are configured to produce streams of air pulsations for enhancing the bending of the plants.

9. An apparatus as in claim 7 together with baffles for directing the air streams at an oblique angle to the longitudinal axis.

10. An apparatus as in claim 7 together with a covering carried by the framework and extending between the depending portions and an additional impeller rotatably mounted to the covering for creating an additional stream of air which is directed downwardly toward the plants.

11. In an apparatus for application of a liquid chemical treatment to plants in a field, a movable framework, first and second spaced-apart depending wall portions mounted upon the framework for providing a space extending longitudinally of the framework, first and second impellers carried by the framework for creating streams of air, first and second shrouds surrounding the first and second impellers and providing exit openings into the space so that streams of air created by the impellers traverse the space in directions at an angle to the longitudinal axis to create turbulence in the air in the space and nozzles carried by the framework for introducing the chemical treatment into the streams of air produced by the impellers.

12. An apparatus as in claim 11 together with a covering extending between the first and second depending wall portions for confining the chemical treatment within the space.

13. An apparatus as in claim 12 together with recirculating means carried by the covering for destroying pests airborne about the plants.

14. An apparatus as in claim 11 wherein the impellers include a disk-like shield rotatable in a direction about an axis and having an outer periphery, a hub mounted to the shield and extending along the axis and first and second blades mounted to the shield and the hub so as to be offset relative to the hub and extend outwardly in opposite directions to the outer periphery of the shield, the blades having a first portion joined to the shield and a second portion inclined relative to the first portion toward the direction of travel.

15. An apparatus as in claim 12 together with means carried by the covering for recirculating chemical treatment airborne about the plants.

16. An apparatus as in claim 11 together with means carried by the framework for controlling the rate at which the chemical treatment is introduced into the streams of air.

17. An apparatus as in claim 11 wherein the first and second spaced-apart depending portions mounted upon the framework are disposed parallel to each other.

18. An apparatus as in claim 11 wherein the impellers include a hub rotatable about an axis and not more than two blades secured to the hub, the two blades extending radially outwardly from the hub in opposite directions.

19. In an apparatus for application of a chemical treatment to plants in a field, a movable framework, first and second spaced-apart depending portions mounted upon the framework for providing a space extending longitudinally of the framework, means carried by the first and second depending portions for creating first and second pulsed streams of air in directions at an angle to the longitudinal axis and means carried by the framework for introducing the chemical treatment into the space whereby the pulsed streams of air facilitate the chemical treatment reaching the underside of the plants.

20. An apparatus as in claim 19 wherein the first and second depending portions have respective lower parts and wherein the means for creating first and second pulsed streams of air include first and second impellers rotatably mounted to the lower parts of the first and second depending portions for directing the pulsed streams of air at the plants.

21. An apparatus as in claim 20 wherein the means carried by the framework for introducing the chemical treatment into the space includes first and second nozzles for introducing the chemical treatment into the first and second pulsed streams of air.

22. In an apparatus for application of a chemical treatment to plants in a field, a movable framework, a hood member carried by the framework for extending over the plants, an impeller rotatably mounted to the hood member for creating a stream of air directed downwardly toward the plants and means carried by the framework for dispensing the chemical treatment onto the plants.

23. An apparatus as in claim 22 wherein the means for dispensing the chemical treatment includes a nozzle.

24. An apparatus as in claim 23 wherein the hood member has opposite first and second sides, first and second spaced-apart depending portions carried by the framework extending from the first and second sides of the hood member and an additional nozzle carried by each of the first and second depending portions for dispensing chemical treatment on the plants.

\* \* \* \* \*